US008870433B2

(12) United States Patent
Um

(10) Patent No.: US 8,870,433 B2
(45) Date of Patent: Oct. 28, 2014

(54) BACKLIGHT UNIT

(75) Inventor: Keetae Um, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 343 days.

(21) Appl. No.: 12/836,041

(22) Filed: Jul. 14, 2010

(65) Prior Publication Data
US 2011/0013421 A1    Jan. 20, 2011

(30) Foreign Application Priority Data

Jul. 14, 2009   (KR) .................. 10-2009-0064067

(51) Int. Cl.
*G02B 6/00* (2006.01)
*F21V 8/00* (2006.01)

(52) U.S. Cl.
CPC ............ *G02B 6/0078* (2013.01); *G02B 6/0038* (2013.01)
USPC .......................................... 362/616; 362/628

(58) Field of Classification Search
CPC ............................. G02B 6/0011; G02B 6/0033
USPC .................................................. 362/616, 628
See application file for complete search history.

(56) References Cited

U.S. PATENT DOCUMENTS

| 6,115,092 | A | * | 9/2000 | Greene et al. ................ 349/74 |
| 6,379,017 | B2 | * | 4/2002 | Nakabayashi et al. ........ 362/619 |
| 7,616,271 | B2 | | 11/2009 | Souk et al. |
| 7,764,334 | B2 | * | 7/2010 | Kitagawa et al. ............ 349/65 |
| 2003/0020189 | A1 | * | 1/2003 | Chen et al. ................... 264/1.24 |
| 2005/0140848 | A1 | * | 6/2005 | Yoo et al. ....................... 349/64 |
| 2007/0171330 | A1 | * | 7/2007 | Hung et al. .................... 349/65 |
| 2008/0030650 | A1 | * | 2/2008 | Kitagawa et al. ............ 349/65 |

FOREIGN PATENT DOCUMENTS

| JP | 08-146230 A | 6/1996 |
| JP | 2002-184231 A | 6/2002 |
| JP | 2002-298629 A | 10/2002 |
| JP | 2008-034372 A | 2/2008 |
| JP | 2009-152152 A | 7/2009 |
| JP | 2010-282900 A | 12/2010 |
| KR | 10-2003-0088835 A | 11/2003 |
| KR | 10-2007-0081564 A | 8/2007 |

OTHER PUBLICATIONS

Office Action dated May 8, 2012 in Japanese Application No. 2010-159901, filed Jul. 14, 2010.
Office Action dated Feb. 12, 2013 in Japanese Application No. 2010-159901, filed Jul. 14, 2010.
Office Action dated Jan. 5, 2011 in Korean Application No. 10-2009-0064067, filed Jul. 14, 2009.
Office Action dated Sep. 9, 2011 in Korean Application No. 10-2009-0064067, filed Jul. 14, 2009.
Office Action dated Aug. 20, 2013 in Japanese Application No. 2010-159901, filed Jul. 14, 2010.

* cited by examiner

*Primary Examiner* — Nimeshkumar Patel
*Assistant Examiner* — Christopher Raabe
(74) *Attorney, Agent, or Firm* — Saliwanchik, Lloyd & Eisenschenk

(57) ABSTRACT

The present invention relates to a backlight unit including a plurality of light guide plates, each discretely arranged with an interval, one or more light sources formed at a lateral surface of the plurality of light guide plates, and a filling material filled among the plurality of light guide plates and having a lower refractive index than that of the light guide plate, whereby each of the plurality of light guide plates can be split-driven to guarantee a uniform luminance at an interval among the plurality of light guide plates.

15 Claims, 7 Drawing Sheets

On Center LED

On Center LED

BACKLIGHT UNIT

CROSS-REFERENCE TO RELATED APPLICATION

This application claims the benefit under 35 U.S.C. §119 of Korean Patent Application No. 10-2009-0064067, filed on Jul. 14, 2009, which is hereby incorporated by reference in its entirety.

FIELD OF THE DISCLOSURE

The present invention relates to a backlight unit, and more particularly to a lateral type backlight unit configured to form an air gap among a plurality of light guide plates to enable a local dimming.

DISCUSSION OF THE RELATED ART

Recently, with the rapid development of informational society, demands on display apparatus have increased in various types, and LCDs have been used in information processing apparatuses that require display devices due to advantage of small size, slim design, light weight and low power consumption.

However, the LCDs need a separate external light source for implementing a high quality of screen as the LCDs cannot emit light itself. Therefore, the LCDs are separately formed with a backlight device as a light source of high brightness in addition to a liquid crystal panel to enable a high quality of screen.

The backlight units are roughly classified, based on arrangement of the light source, into the direct-lighting type using a reflecting curtain or the like, and the edge-lighting type using a light guide plate.

The edge-lighting type with relatively thin thickness is mainly used for LCDs that require a thin slim design in the portable communication devices. The direct-lighting type with a relatively high optical efficiency is largely used for devices that call for a large screen such as note books or TV monitors.

Concomitant with recent trend of thin type LCDs, the edge-lighting type is preferred. The direct-lighting type backlight unit has a structure that can implement a local dimming function. The local dimming function is referred to as a backlight driving method, in which a liquid crystal panel is divided into a plurality of regions, and the luminance value of a light source is adjusted for each divided region in accordance with a gray level corresponding to the divided region. Therefore, when the LCD device has a local dimming function, a high contrast ratio and a clear image can be implemented. Further, since the light source can be driven only for a desired region, it is possible to reduce power consumption.

However, the direct type backlight unit requires higher power consumption than the edge type backlight unit. To secure uniformity of light, the direct type backlight unit should have a sufficient thickness. Therefore, there is a limit in reducing the thickness of the backlight unit, that is, the thickness of the LCD device.

Meanwhile, the edge type backlight unit requires lower power consumption than the direct type backlight unit, and can be manufactured with a small thickness. In the edge type backlight unit, however, although light is partially provided to a light guide plate through a local dimming function, the light is uniformly emitted to the upper portion by the light guide plate. That is, the edge type backlight unit cannot obtain an effect of the local dimming function.

For example, in order to improve the difficulty of implementing the local dimming, a method has been disclosed in which the light guide plate is blocked to allow each block to control the light source supply and to ease split driving. There is generated a disadvantage in that each block is separately installed to generate a borderline between the blocks and to act as a noise in implementing video images.

BRIEF SUMMARY

Accordingly, the present invention is disclosed to solve at least one or more of the above problems and/or disadvantages in a whole or in part and to provide at least the advantages described hereinafter. In order to achieve the above objects, in whole or in part, and in accordance with the purposes of the invention, as embodied and broadly described, and there is provided a backlight unit configured to form an air gap by providing an interval among a plurality of light guide plates to enable a local dimming.

In one general aspect of the present invention, a backlight unit is provided, the backlight comprising: a plurality of light guide plates, each discretely arranged with an interval; one or more light sources formed at a lateral surface of the plurality of light guide plates; and a filling material filled among the plurality of light guide plates and having a lower refractive index than that of the light guide plate.

In some exemplary embodiments of the present invention, the backlight unit may include one or more spacers configured to maintain the interval by being inserted into the plurality of light guide plates, or a filling material.

The backlight unit according to the present invention has an advantageous effect in that each of the plurality of light guide plates can be split-driven to guarantee a uniform luminance at an air gap portion among the plurality of light guide plates.

BRIEF DESCRIPTION OF THE DRAWINGS

The accompanying drawings, which are included to provide a further understanding of the present invention and are incorporated in and constitute a part of this application, and together with the description serve to explain the principle of the invention. In the drawings.

DETAILED DESCRIPTION

Figure 1:
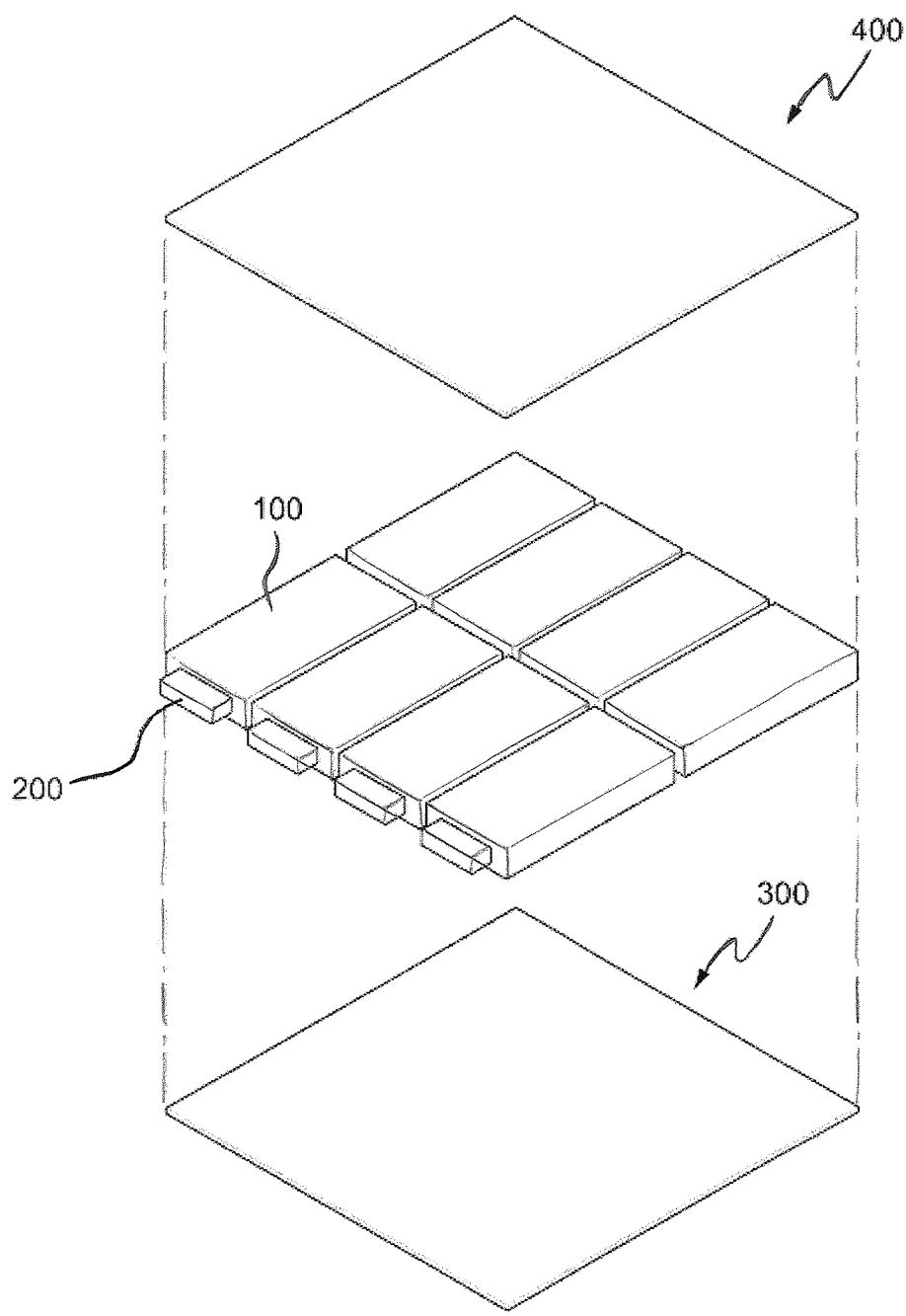
FIG. 1 is a perspective view illustrating a backlight unit according to an exemplary embodiment of the present invention.

Although the present disclosure may be implemented in various modifications and exemplary embodiments, particular exemplary embodiments will be illustrated and detailed explanation thereto will be provided. The exemplary embodiments may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Accordingly, the described aspect is intended to embrace all such alterations, modifications, and variations that fall within the scope and novel idea of the present disclosure.

Meanwhile, the terminology used herein is for the purpose of describing particular implementations only and is not intended to be limiting of the invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

For example, a second constituent element may be denoted as a first constituent element without departing from the scope and spirit of the present disclosure, and similarly, a first constituent element may be denoted as a second constituent element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Now, the present invention will be described in detail with reference to the accompanying drawings.

Figure 2:
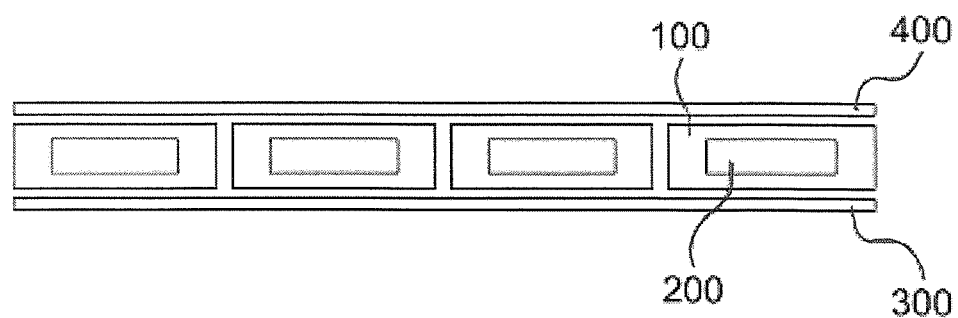
FIG. 2 is a front view illustrating a backlight unit according to an exemplary embodiment of the present invention.
Figure 3:
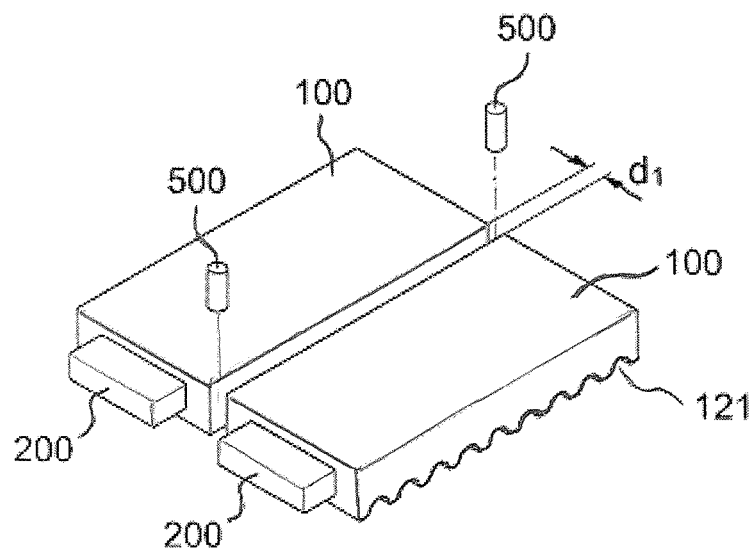
FIG. 3 is a perspective view illustrating an air gap formed on a light guide plate according to an exemplary embodiment of the present invention.

FIG. 1 is a perspective view illustrating a backlight unit according to an exemplary embodiment of the present invention, FIG. 2 is a front view illustrating a backlight unit according to an exemplary embodiment of the present invention, and FIG. 3 is a perspective view illustrating an air gap formed on a light guide plate according to an exemplary embodiment of the present invention.

A backlight unit according to an exemplary embodiment of the present invention may include a plurality of light guide plates (100), each discretely arranged with an interval; one or more light sources (200) formed at a lateral surface of the plurality of light guide plates to transmit light to the plurality of light guide plates (100); and a filling material filled among the plurality of light guide plates (100) and having a lower refractive index than that of the light guide plate (100).

A reflection plate (300) may be formed at a lower surface of the light guide plate (100) to emit light to an upper surface of the light guide plate by allowing the light emitted from a light source to be reflected. The reflection plate (300) is not limited to any particular type as long as it is configured to reflect light. For example, the reflection plate (300) may be a silver reflection plate, an aluminum reflection plate, or a multilayered polymer.

Furthermore, the light guide plate (100) may be further formed on an upper surface thereof with a dispersion plate (400) to disperse light emitted from the light guide plate (100). The dispersion plate (400) enables maintenance of uniform luminance although there is an interval among the light guide plates (100).

The light source (200) is not limited to any particular type, but may be any type of element that is capable of emitting light. For example, an LED (Light Emitting Diode) may be used to enable a split driving by being arranged at each of the light guide plates (100), as shown in the drawing.

The light source (200) is formed at a lateral lengthwise surface of the light guide plate (100), and one or more light sources (200) may be formed at one light guide plate (100) for an adequate split driving. For example, as shown in FIG. 2, one light source (200) may be formed at one light guide plate (100), and one light guide plate (100) may be formed with three light sources (200. not shown).

That is, each of the light sources (200) is correspondingly arranged to each of the plurality of light guide plates (100). The light guide plate (100) may take the conventional shape but the shape of the light guide plate (100) may be changed to cater to the exemplary embodiment of the present invention. For example, in a case the light guide plate (100) is formed with a wedge, the shape of the light guide plate (100) may be appropriately determined, and a random appropriate surface form such as a linear surface, a curved surface or the like may be formed at the corner portion to be applied to the shape of the light guide plate (100).

Although not illustrated in the drawing, the light guide plate (100) may be formed thereon with prism-shaped prominence and depression (ruggedness, unevenness) which may in turn take the shape of a linear surface, a refracted surface, a curved surface, or the like.

Furthermore, the prism-like unevenness may be implemented in a continuous pattern or a discontinuous pattern, or any one of a convex part, a concave part or a combination of the two. For example, the prism-shaped ruggedness may be formed with a series of convex part or concave part having a continuous ridge, or a series of convex part or concave part having a discontinuous ridge.

Now, referring to FIG. 3, the light guide plate (100) is formed thereunder with a micro-pattern (121), where light incident on a lower surface of the light guide plate (100) fails to meet the total reflection condition to be emitted to a front surface of the light guide plate (100). The micro-pattern (121) may be such that density and size are differently distributed based on position to meet the degree of uniformity. For example, the light guide plate (100) may be configured in such a manner that density of the micro-pattern (121) is increased as distanced from the light source (200), the micro-pattern (121) is formed with a lens pattern, or a predetermined prism pattern is formed on the lens pattern to allow the light incident on the lower surface of the light guide plate (100) is emitted to a front surface of the light guide plate (100). The micro-pattern may be formed on an upper surface, and the prism pattern may be formed on the lower surface as mentioned above.

Now, the plurality of light guide plates, each being discretely formed, will be described with reference to FIG. 3.

The plurality of light guide plates (100) is discretely formed at a predetermined interval (d1). An air gap is formed at the interval (d1), and the air gap has a lower refractive index than that of the light guide plate (100), whereby the light incident on the light guide plate (100) from the light source (200) installed at the lateral surface of the light guide plate (100) is prevented from being diffused to the light guide plate (100) adjacent to the lengthwise lateral surface of the light guide plate (100). That is, the light having an angle formed by emission from the lateral surface of the light guide plate (100) is totally reflected to fail to be diffused to the neighboring light guide plate (100).

At this time, the interval (d1) among the plurality of light guide plates (100) is abutted by a spacer (500), where the spacer (500) is fixed at both distal ends of the light guide plate (100) to allow the plurality of light guide plates (100) to maintain a predetermined interval (d1). The spacer (500) may be cylindrically formed to maintain the interval (d1) among the plurality of light guide plates (100) at a predetermined constant distance and minimize a portion contacting the light guide plate (100), minimizing the contact loss.

The interval (d1) among the plurality of light guide plates (100) may be formed in the range of 0.1 mm~5 mm for possible split driving and having a predetermined luminance by diffusion, and as a result, the diameter of the spacer (500) may be so manufactured as to cater to the interval (d1) of the light guide plate (100). In a case the interval (d1) is less than 0.1 mm, it is difficult to manufacture the light guide plate and in a case the interval (d1) is larger than 5 mm, a uniform luminance cannot be guaranteed.

However, the interval (d1) is not always fixed by the spacer (500), but may be fixed by various other methods. For example, the interval (d1) may be fixed by a method of attaching the plurality of light guide plates (100) to the reflection plate (300).

Figure 4:
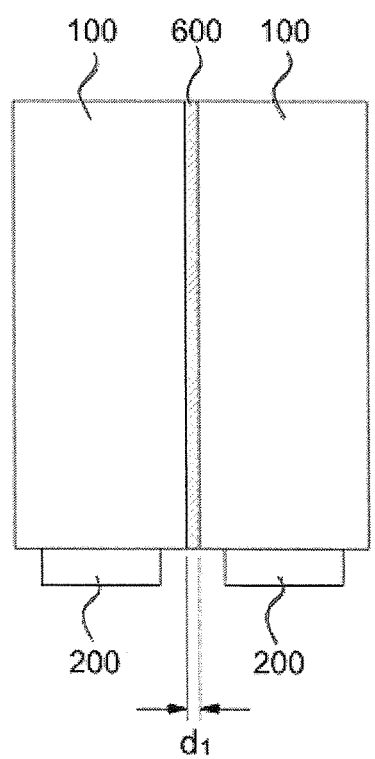
FIG. 4 is a bottom view illustrating a filling material formed at a light guide plate according to an exemplary embodiment of the present invention.

FIG. 4 is a bottom view illustrating a filling material formed at a light guide plate according to an exemplary embodiment of the present invention.

Referring to FIG. 4, a filling material (600) may be filled among (d1) of the plurality of light guide plates (100), where the filling material (600) has a lower refractive index than that of the light guide plate (100). The filling material (600) is filled in the interval (d1) of the light guide plate (100), and the interval (d1) less than 0.1 mm may be used in a case the filling material (600) is filled.

TABLE 1

| n1 | n2 | Critical angle (degree) | Remarks |
|---|---|---|---|
| 1.52 | 1.00 | 41.1 | Air |
|  | 1.29 | 58.1 |  |
|  | 1.41 | 68.1 |  |
|  | 1.45 | 72.5 |  |

Table 1 indicates a critical angle of total reflection based on a difference of refractive indexes between n1 and n2, where n1 is a refractive index of the light guide plate (100), while n2 is a refractive index of the filling material (600).

As shown in Table 1, in a case the refractive index of the light guide plate (100) is 1.52, and the refractive index of the filling material (600) is 1.00, a critical angle of the total reflection is 41.1 degree. Meanwhile, it can be noted that in a case a refractive index of the filling material (600) is 1.45, a critical angle of the total reflection is 72.5, such that the higher refractive index of the filling material (600) prevents the total reflection to increase the amount of light emitted from the light guide plate (100). Therefore, the filling material (600) must use a material having a lower refractive index, where the refractive index may be a silicone or photopolymer with a refractive index of 1.29.

Figure 5:
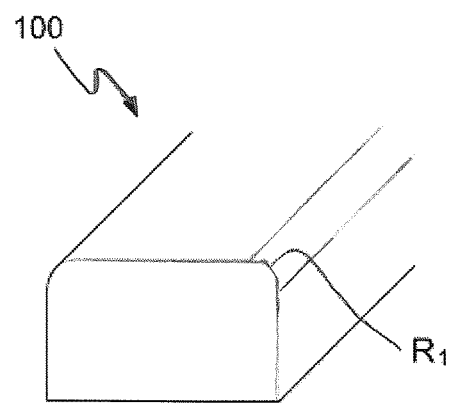
FIG. 5 is a perspective view illustrating a light guide plate whose corner is rounded according to an exemplary embodiment of the present invention.
Figure 6:
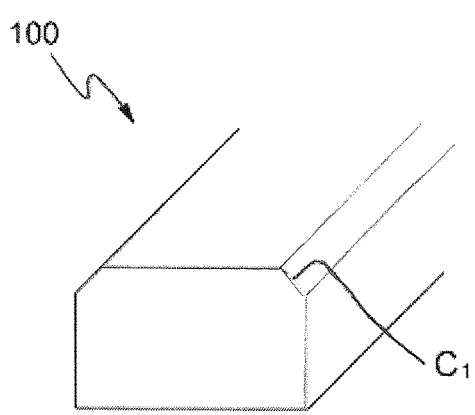
FIG. 6 is a perspective view illustrating a light guide plate whose corner is chamfered according to another exemplary embodiment of the present invention.

FIG. 5 is a perspective view illustrating a light guide plate whose corner is rounded according to an exemplary embodiment of the present invention and FIG. 6 is a perspective view illustrating a light guide plate whose corner is chamfered according to another exemplary embodiment of the present invention.

Referring to FIG. 5, the light guide plate (100) is rounded at an upper corner to have a predetermined radius of curvature (R1). This configuration allows the luminance at the corner portion of the light guide plate (100), whereby an air gap among the plurality of light guide plates (100) can entirely have a uniform luminance by way of a diffusing plate. In the same principle, an upper corner of the light guide plate (100) is made to have a chamfered surface (C1), whereby the luminance is increased, as shown in FIG. 6.

Figure 7:
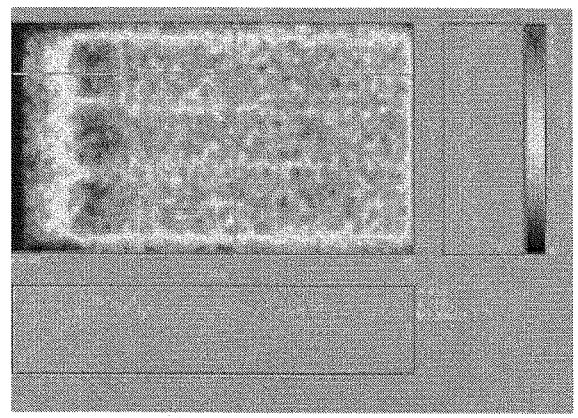
FIGS. 7 through 9 are simulations illustrating a brightness change responsive to changes of corner curvature of a light guide plate in a backlight unit according to an exemplary embodiment of the present invention.
Figure 8:
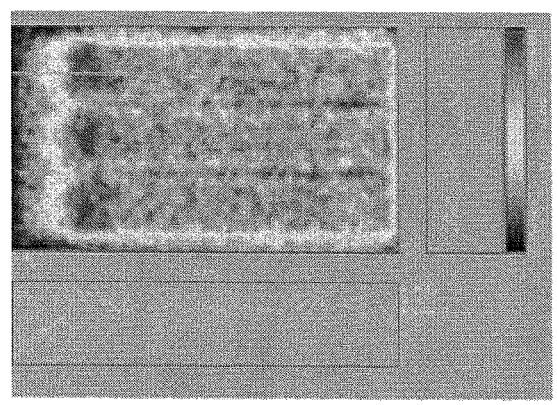
Figure 9:
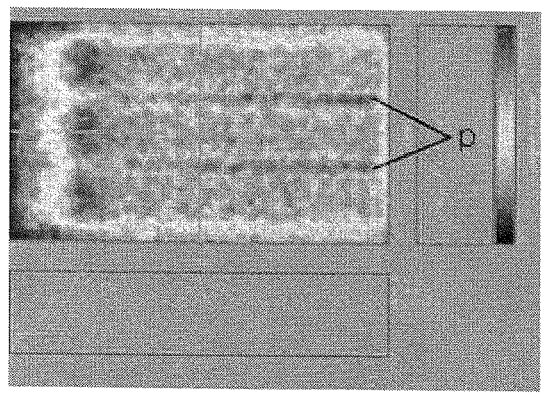
Figure 10:
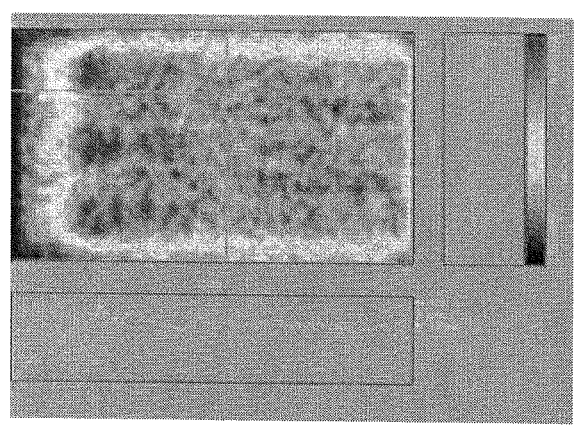
FIG. 10 is a simulation illustrating a brightness of a backlight unit in case a corner of the light guide plate is chamfered according to an exemplary embodiment of the present invention.

FIGS. 7 through 9 are simulations illustrating a brightness change responsive to changes of corner curvature of a light guide plate in a backlight unit according to an exemplary embodiment of the present invention, FIG. 10 is a simulation illustrating a brightness of a backlight unit in case a corner of the light guide plate is chamfered according to an exemplary embodiment of the present invention.

Each of the light guide plate (100) in FIG. 7 has a dimension of 80 mm (length)×12 mm (width)×10 mm (height), where a radius of curvature (R1) at the upper corner of the light guide plate (100) is 1.0 mm, where a luminance was measured. At this time, a uniform luminance was measured from the interval of the light guide plate (100). The uniform luminance has been maintained, in a case a radius of curvature at the upper corner portion of the light guide plate (100) is 1.5 mm, as illustrated in FIG. 8. However, it was confirmed from FIG. 9 that the luminance improves at an interval (P) of the light guide plate (100) to reduce the uniformity, in case of the radius of curvature (R1) being at 2.0 mm.

At this time, an additional diffusing plate may be installed at an upper surface of the light guide plate (100) to complement the disadvantage. As a result of the simulation, it was confirmed that a radius of curvature of 1.0 mm~1.5 mm at the upper corner surface of the light guide plate (100) exhibited the highest uniformity. That is, if the radius of curvature deviates from the scope of 1.0 mm~1.5 mm, the uniformity of light decreases.

It was confirmed that, in a case the upper corner of the light guide plate (100) is chamfered to form a chamfered surface (C1), and the length of the chamfered surface (C1) is 2 mm, a uniform and same luminance was formed on the air gap among the light guide plates (100).

The numerical values shown in the above exemplary embodiments are results of simulations under one single condition. Therefore, the disclosed numerical values do not indicate the numerical limitations.

Figure 11:
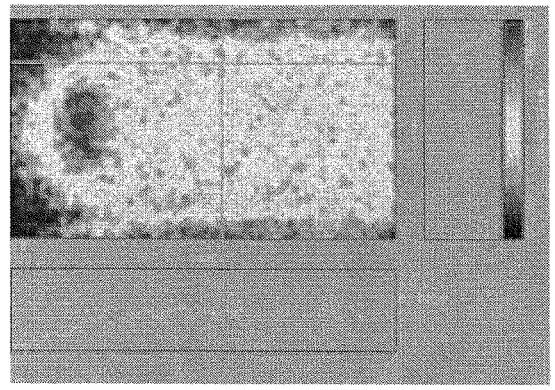
FIG. 11 is a simulation illustrating a split-driven state of a center portion of a backlight unit according to prior art.
Figure 12:
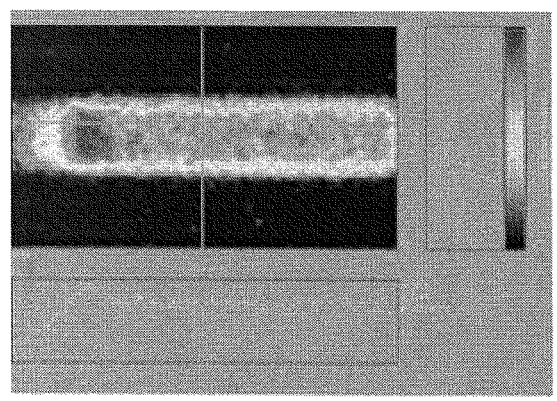
FIG. 12 is a simulation illustrating a split-driven state of a light guide plate in a backlight unit according to an exemplary embodiment of the present invention.

FIG. 11 is a simulation illustrating a split-driven state of a center portion of a backlight unit according to prior art, and FIG. 12 is a simulation illustrating a split-driven state of a light guide plate in a backlight unit according to an exemplary embodiment of the present invention.

As in FIG. 11, the conventional backlight is configured with a plurality of LEDs on one light guide plate, where, in a case only a light source at the center is turned on, it was confirmed that an entire light guide plate is diffused with light.

However, as illustrated in FIG. 12 that shows a backlight unit according to the exemplary embodiments of the present invention, in a case only a light source at the center is turned on, it was confirmed that only the light guide plate (100) at the center is split-driven. Therefore, it is possible to implement the local dimming at the conventional edge-light type backlight unit.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
a plurality of light guide plates;
one or more light sources formed at a lateral surface of the plurality of light guide plates; and
a filling material filled among the plurality of light guide plates and having a lower refractive index than that of the light guide plate,
wherein the plurality of light guide plates comprises an upper corner facing an adjacent light guide plate and having a rounded shape of a predetermined radius of curvature,
wherein the filling material is silicon or photopolymer,
wherein the plurality of light guide plates is discretely formed with an interval a 0.1 mm to 5 mm, and
wherein the predetermined radius of curvature is more than 0.1 mm but less than 1.5 mm.

2. The backlight unit of claim 1, wherein one or more spacers inserted among the plurality of light guide plates for maintaining the interval are formed.

3. The backlight unit of claim 2, wherein the spacer is cylindrically shaped.

4. The backlight unit of claim 2, wherein the spacers are discretely inserted in the plurality of light guide plates.

5. The backlight unit of claim 1, wherein the light guide plates are formed thereunder with micro-patterns.

6. The backlight unit of claim 1, further comprising a reflection plate at a lower side of the light guide plate.

7. The backlight unit of claim 6, wherein the light guide plate is integrally formed with the reflection plate.

8. The backlight unit of claim 1, further comprising a diffusing plate at an upper side of the light guide plate.

9. The backlight unit of claim 1, wherein light transmitted to the plurality of light guide plates is not diffused to neighboring light guide plates, but totally reflected.

10. The backlight unit of claim 1, wherein the plurality of light guide plates is so formed as to implement a local dimming.

11. The backlight unit of claim 1, wherein the light sources are correspondingly arranged to the plurality of light guide plates.

12. The backlight unit of claim 1, wherein the light source is an LED (Light Emitting Diode).

13. The backlight unit of claim 1, wherein the plurality of light guide plates is formed at an upper surface thereof with a prism-like unevenness.

14. The backlight unit of claim 13, wherein the prism-like unevenness is implemented in continuous patterns or discontinuous patterns, or in any one of a concave part, a convex part or a combination of the two.

15. The backlight unit of claim 5, wherein a density of the micro-patterns increases as distance from the light source increases.

* * * * *